(12) United States Patent
Salama et al.

(10) Patent No.: US 11,676,115 B2
(45) Date of Patent: Jun. 13, 2023

(54) AUTHORIZATION SYSTEM USING PARTIAL CARD NUMBERS

(71) Applicant: The Toronto-Dominion Bank, Toronto (CA)

(72) Inventors: Hisham Salama, Charlotte, NC (US); Lauren Van Heerden, Bedford, NH (US); Ian Sundberg, Charlotte, NC (US); Anand Kannan, North York (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 396 days.

(21) Appl. No.: 16/914,660

(22) Filed: Jun. 29, 2020

(65) Prior Publication Data

US 2020/0327513 A1 Oct. 15, 2020

Related U.S. Application Data

(63) Continuation of application No. 14/301,082, filed on Jun. 10, 2014, now Pat. No. 10,726,400.
(Continued)

(51) Int. Cl.
*G06Q 20/10* (2012.01)
*G06Q 20/40* (2012.01)

(52) U.S. Cl.
CPC .......... *G06Q 20/10* (2013.01); *G06Q 20/401* (2013.01); *G06Q 20/4016* (2013.01)

(58) Field of Classification Search
CPC ................................. G06F 17/60; G06F 20/00
See application file for complete search history.

(56) References Cited

U.S. PATENT DOCUMENTS 5,754,653 A 5/1998 Canfield
5,920,847 A 7/1999 Kolling
(Continued)

FOREIGN PATENT DOCUMENTS

WO WO-2006004794 A2 * 1/2006 ............. G06Q 20/04
WO 20120135892 A1 10/2012

OTHER PUBLICATIONS

Bella et al., "Verifying the set registration protocols," Technical Report No. 531 UCAM-CL-TR-531, University of Cambridge Computer Laboratory, 2002 (24 pages).
(Continued)

*Primary Examiner* — Patrick McAtee
*Assistant Examiner* — Nakia Leffall-Allen
(74) *Attorney, Agent, or Firm* — Duane Morris LLP (57) ABSTRACT

An authorization system includes a database, and at least one computer server in communication with the database. The database includes a plurality of database records, each including an account number and an associated card number. Each card number has fewer digits than the associated account number. The server is configured to receive, from a communications terminal, a request message that initiates a transaction with the server. The server is configured to request an authentication credential from the terminal, and in the database locate the card number that matches the received authentication credential and locate the account number that is associated with the located card number. The server is configured to request authorization of a test transaction using the account number, receive an authorization response confirming authorization of the test transaction, and authorize the initiated transaction in response to the authorization response. The test transaction is different from the initiated transaction.

24 Claims, 4 Drawing Sheets

Related U.S. Application Data (60) Provisional application No. 61/880,432, filed on Sep. 20, 2013, provisional application No. 61/833,443, filed on Jun. 10, 2013.

(56) References Cited

U.S. PATENT DOCUMENTS

| | | | |
|---|---|---|---|
| 7,580,898 B2 * | 8/2009 | Brown | G07F 7/1083 |
| | | | 705/50 |
| 7,810,720 B2 | 10/2010 | Lovett | |
| 7,835,988 B2 | 11/2010 | Horvath et al. | |
| 8,140,418 B1 | 3/2012 | Casey et al. | |
| 8,229,848 B2 | 7/2012 | Krueger | |
| 8,290,875 B2 | 10/2012 | Itoi et al. | |
| 8,434,133 B2 | 4/2013 | Kulkarni et al. | |
| 8,453,925 B2 | 6/2013 | Fisher et al. | |
| 8,494,959 B2 | 7/2013 | Hathaway et al. | |
| 8,595,812 B2 | 11/2013 | Bomar et al. | |
| 8,615,468 B2 | 12/2013 | Varadarajan | |
| 8,688,543 B2 | 4/2014 | Dominguez | |
| 10,726,400 B2 * | 7/2020 | Salama | G06Q 20/10 |
| 2002/0095589 A1 | 7/2002 | Keech | |
| 2003/0004876 A1 | 1/2003 | Jacobson | |
| 2004/0030659 A1 | 2/2004 | Gueh | |
| 2004/0243520 A1 * | 12/2004 | Bishop | G06Q 20/367 |
| | | | 705/75 |
| 2005/0102234 A1 | 5/2005 | Devine | |
| 2007/0050255 A1 | 3/2007 | Hobbs et al. | |
| 2008/0208697 A1 | 8/2008 | Kargman | |
| 2008/0270301 A1 | 10/2008 | Jones et al. | |
| 2010/0057623 A1 | 3/2010 | Kapur et al. | |
| 2010/0076891 A1 | 3/2010 | Vanmoor | |
| 2010/0228668 A1 * | 9/2010 | Hogan | G06Q 20/02 |
| | | | 705/41 |
| 2010/0299267 A1 | 11/2010 | Faith et al. | |
| 2011/0137804 A1 | 6/2011 | Peterson | |
| 2011/0153461 A1 | 6/2011 | Royyuru | |
| 2011/0270757 A1 | 11/2011 | Hammad | |
| 2012/0072346 A1 | 3/2012 | Mirit et al. | |
| 2012/0102554 A1 | 4/2012 | Emerick et al. | |
| 2012/0109818 A1 | 5/2012 | Carlson et al. | |
| 2012/0143770 A1 | 6/2012 | Pauker | |
| 2012/0239572 A1 | 9/2012 | Wolfs et al. | |
| 2012/0284035 A1 | 11/2012 | Gillin | |
| 2012/0317018 A1 | 12/2012 | Barnett | |
| 2012/0317628 A1 | 12/2012 | Yeager | |
| 2013/0008956 A1 | 1/2013 | Ashfield | |
| 2013/0144776 A1 | 6/2013 | Webster et al. | |
| 2013/0198082 A1 | 8/2013 | Eichner | |
| 2013/0198838 A1 | 8/2013 | Schmidt et al. | |
| 2013/0275308 A1 | 10/2013 | Paraskeva et al. | |
| 2014/0008434 A1 | 1/2014 | de Geer et al. | |
| 2014/0081784 A1 | 3/2014 | Ahn | |
| 2016/0232520 A9 | 8/2016 | Singhal | |

OTHER PUBLICATIONS

Bella et al., "Formal verification of cardholder registration in Set," Computer Security-ESORICS 2000, pp. 159-174.

Xiao et al., "A purchase protocol with live cardholder authentication for online credit card payment," Proceedings—The 4th International Symposium on Information Assurance and Security, IAS 2008, pp. 15-20.

Oliveira et al., "The power of credit card numbers and long cvvs," 5th International Conference on Date Network and System Security (NSS), Sep. 2011, pp. 290-294.

Abbass et al., "Building a trust model for generating and validating assurance keys between consumers in e-commerce," International Journal of Computer Applications, vol. 57, No. 1, 2012, pp. 17-25.

Buccafurri et al., "Implementing disposable credit card numbers by mobile phones," Electronic Commerce Research, vol. 11, No. 3, Sep. 2011, pp. 271-296.

Graefe et al., "Credit card transaction security," Proceedings of the 4th Annual Conference on Information Security Curriculum Development, 2007 (6 pages).

* cited by examiner

AUTHORIZATION SYSTEM USING PARTIAL CARD NUMBERS

RELATED APPLICATIONS

This patent application is a continuation of U.S. patent application Ser. No. 14/301,082, filed Jun. 10, 2014, which claims the benefit of the filing dates of U.S. patent application Ser. No. 61/833,443, filed Jun. 10, 2013 and U.S. patent application Ser. No. 61/880,432, filed Sep. 20, 2013, the contents of all of which are incorporated herein by reference.

FIELD

This patent application relates to a method and system for authorizing transactions.

BACKGROUND

Online banking often requires the payment cardholder to provide the cardholder's financial institution server with the cardholder's username and password to authenticate to the financial institution server. Relying on the username and password for cardholder authentication creates a serious risk of fraud, particularly for high value financial transactions.

SUMMARY

This patent application discloses a system and method that uses a partial payment card number associated with a cardholder to authorize a transaction.

In accordance with a first aspect of the disclosure, there is provided a method of authorizing a transaction. The method involves at least one computer server authenticating a payment cardholder from a cardholder credential that is received from a communications terminal, and receiving from the communications terminal a request to initiate an online transaction with the at least one computer server. The at least one computer server is in communication with a database comprising a plurality of database clusters each uniquely associated with a respective payment cardholder. Each database cluster identifies a unique account number of an authentication card that is issued to the payment cardholder, and a partial payment card number of at least one payment card that is associated with the authentication card. Each partial payment card number has fewer digits than the associated unique account number.

The at least one computer server requests an authentication credential from the communications terminal in response to determining that the requested online transaction possesses an inherent high risk of fraud. In response to the authentication credential request, the at least one computer server receives an authentication credential from the communications terminal, and uses the received cardholder credential and the received authentication credential to locate the authentication card that is uniquely associated with the payment cardholder and the received authentication credential in the database. The received authentication credential has fewer digits than the account number of the located authentication card. The at least one computer server authorizes the requested online transaction in response to authenticating the payment cardholder using the account number of the located authentication card.

In accordance with a second aspect of the disclosure, there is provided s transaction authorization system that includes a database and at least one computer server in communication with the database. The database comprises a plurality of database clusters, each uniquely associated with a respective payment cardholder. Each database cluster identifies a unique account number of an authentication card that is issued to the payment cardholder, and a partial payment card number of at least one payment card that is associated with the authentication card. Each partial payment card number has fewer digits than the associated unique account number.

The at least one computer server is configured to authenticate a payment cardholder from a cardholder credential received from a communications terminal, to receive from the communications terminal a request to initiate an online transaction with the computer server, and to request an authentication credential from the communications terminal in response to determining that the requested online transaction possesses an inherent high risk of fraud.

The at least one computer server is configured to receive, in response to the authentication credential request, an authentication credential from the communications terminal, and to use the received cardholder credential and the received authentication credential to locate the authentication card that is uniquely associated with the payment cardholder and the received authentication credential in the database. The received authentication credential has fewer digits than the account number of the located authentication card. The at least one computer server is also configured to authorize the requested online transaction in response to authenticating the payment cardholder using the account number of the located authentication card.

The authentication credential may further comprise at least one of an expiration date and a card security code.

In a preferred implementation, the transaction authorization system is configured to determine that the requested online transaction possesses a high risk of fraud by determining that the online transaction involves a transfer or payment of a large monetary amount or opening a new financial account. The authorization system receives the cardholder credential via a first communications channel established with the communications terminal, and receives the authentication credential via a second communications channel established with the communications terminal, the second communications channel being distinct from the first communications channel. The authorization system also receives the request to initiate an online transaction via the first communications channel.

The transaction authorization system may authenticate the payment cardholder using the account number of the located authentication card by issuing an authorization request for a financial transaction with the account number of the authentication card, receiving an authorization response in response to the authorization request, and authenticating the payment cardholder in accordance with an outcome of the authorization request. The authorization request may comprise a request for authorization of a financial transaction for a transaction amount using the account number of the located authentication card.

Since authentication of the cardholder is initiated using partial payment card data that, without more, cannot be used to complete a financial transaction, the method may reduce the possibility of fraudulent transactions.

BRIEF DESCRIPTION OF THE DRAWINGS

An exemplary authentication server, and method of authorizing an online transaction will now be described, with reference to the accompanying drawings, in which.

DETAILED DESCRIPTION

Cardholder Authentication Network

Figure 1:
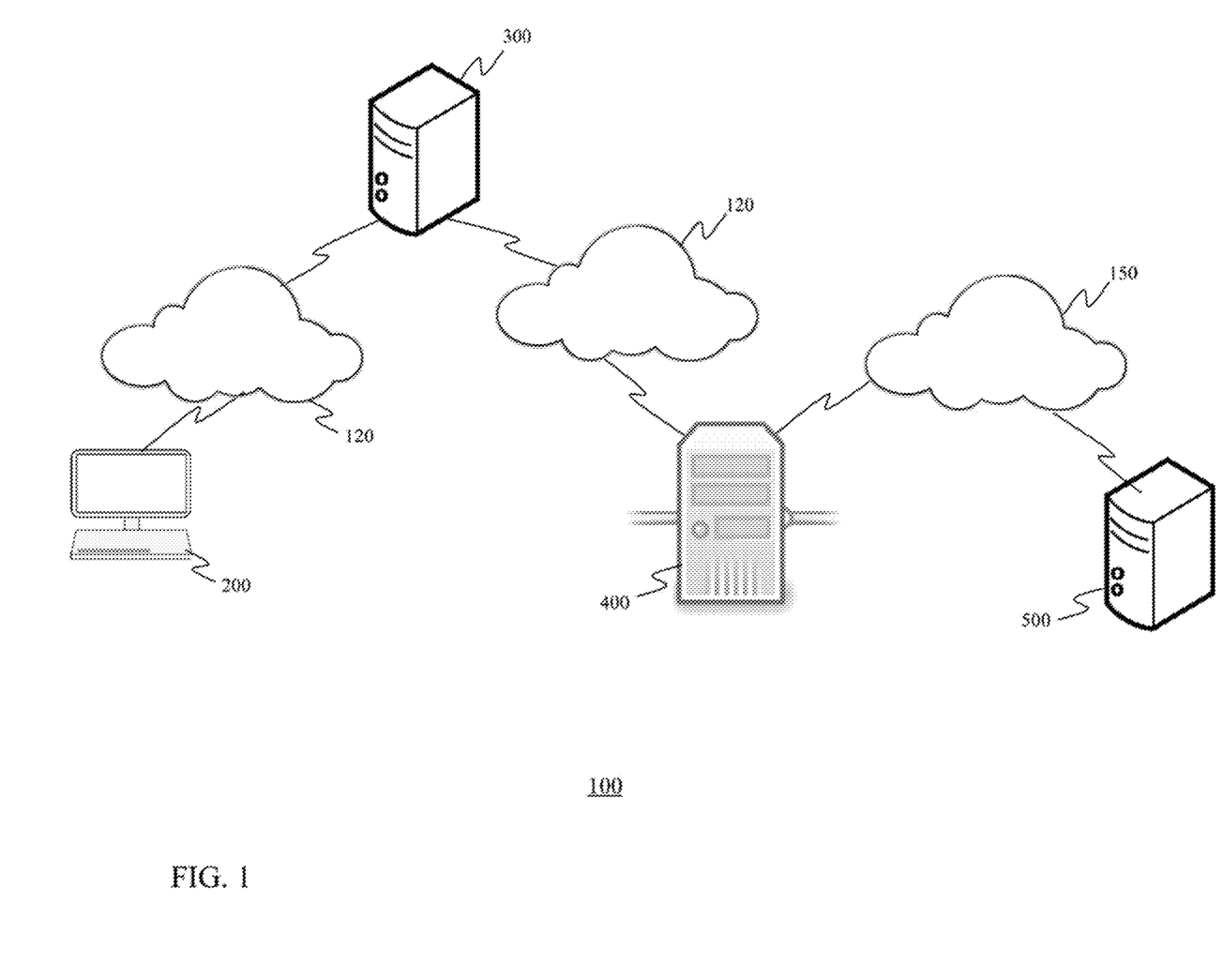
FIG. 1 is a schematic view of a cardholder authentication network, depicting a communications terminal, an authentication server, and a payment card issuer server, in accordance with the disclosed embodiments.

FIG. 1 is a schematic view of a cardholder authentication network, denoted generally as 100. As shown, the cardholder authentication network 100 comprises a communications terminal 200, an online banking server 300, an authentication server 400, and an issuer server 500. The cardholder authentication network 100 also includes a communications network 120 that facilitates communication between the communications terminal 200 and the online banking server 300.

The cardholder authentication network 100 may also include a communications network 130 that facilitates communication between the online banking server 300 and the authentication server 400, and a communications network 150 that facilitates communication between the authentication server 400 and the issuer server 500. As an example, the communications network 150 may comprise VisaNet or the Mastercard Network.

Although the cardholder authentication network 100 is shown comprising the online banking server 300 distinct from the authentication server 400, the functionality of the online banking server 300 and the authentication server 400 may be incorporated into a single common server. Further, although the cardholder authentication network 100 is shown comprising only a single communications terminal 200, a single online banking server 300, and a single authentication server 400, the cardholder authentication network 100 typically comprises a plurality of the communications terminals 200, a plurality of the online banking servers 300 and a plurality of the authentication servers 400.

Communications Terminal

Each communications terminal 200 may be implemented as a personal computer or a mobile communications device, and typically includes a display device, user input device, and a data processing system. The user input device may be provided as a keyboard, biometric input device (e.g. microphone) and/or a touch-sensitive layer provided on the display. The data processing system typically comprises a microprocessor, a communication sub-system and a tangible, non-transitory memory. The communication sub-system allows the communications terminal 200 to communicate with the authentication server 300 via the communications network 120.

The memory includes computer processing instructions stored thereon which, when accessed from the memory and executed by the microprocessor, implement an operating system that is configured to display output on the display, to receive user input from the input device, and to send communication signals to and receive communication signals from the authentication server 300 via its communication sub-system.

Online Banking Server

The online banking server 300 typically comprises a web-based computer server that is configured to communicate with the communications terminals 200 via the communications network 120. The online banking server 300 is typically deployed by a financial institution for which a payment card issuer issues payment cards (e.g. debit cards, credit cards) to clients ("cardholders") of the financial institution.

The online banking server 300 maintains a cardholder database that includes a plurality of clusters each associated with a respective payment cardholder. Each cluster of the cardholder database typically identifies one or more cardholder credentials (e.g. username, payment card number) that the cardholder uses to authenticate to the online banking server 300.

The financial institution also maintains a plurality of financial accounts each associated with a respective cardholder. Each financial account may comprise any of a savings account, a credit card account and a line of credit account. The online banking server 300 maintains an accounts database that includes a plurality of clusters each associated with a respective financial account. Each cluster of the accounts database typically comprises a plurality of database records, each identifying a credit/deposit entry to the associated financial account, and the online banking server 300 is configured to post credits and debits to the respective financial accounts via the accounts database.

As will be discussed below, the online banking server 300 is configured to authenticate a payment cardholder from a cardholder credential that is received from one of the communications terminals 200, to receive from the communications terminal 200 a request to initiate an online "card-not-present" transaction with the banking server 300, and to determine whether the requested online transaction initiated with the online banking server 300 possesses an inherent high risk of fraud. The online banking server 300 relies on an authentication response message received from the authentication server 400 to determine whether to proceed with such a high risk online transaction. As used herein, a "card-not-present" online transaction is a transaction in which the operator of the communications terminal 200 uses a payment card to complete the transaction with the online banking server 300 but is not physically present at (i.e. the communications terminal 200 is situated at a location remote from) the premises of the financial institution associated with the online banking server 300. A "high risk" transaction is a transaction that the financial institution has predetermined to possess an inherent high risk of fraud, such as, but not limited to, a transfer or payment for a large monetary amount, and the opening of a new financial account.

Authentication Server

The authentication server 400 may include a computer server that is configured to communicate with the online banking server 300 via the communications network 130. The authentication server 400 is typically deployed by the financial institution that deployed the online banking server 300.

Figure 2:
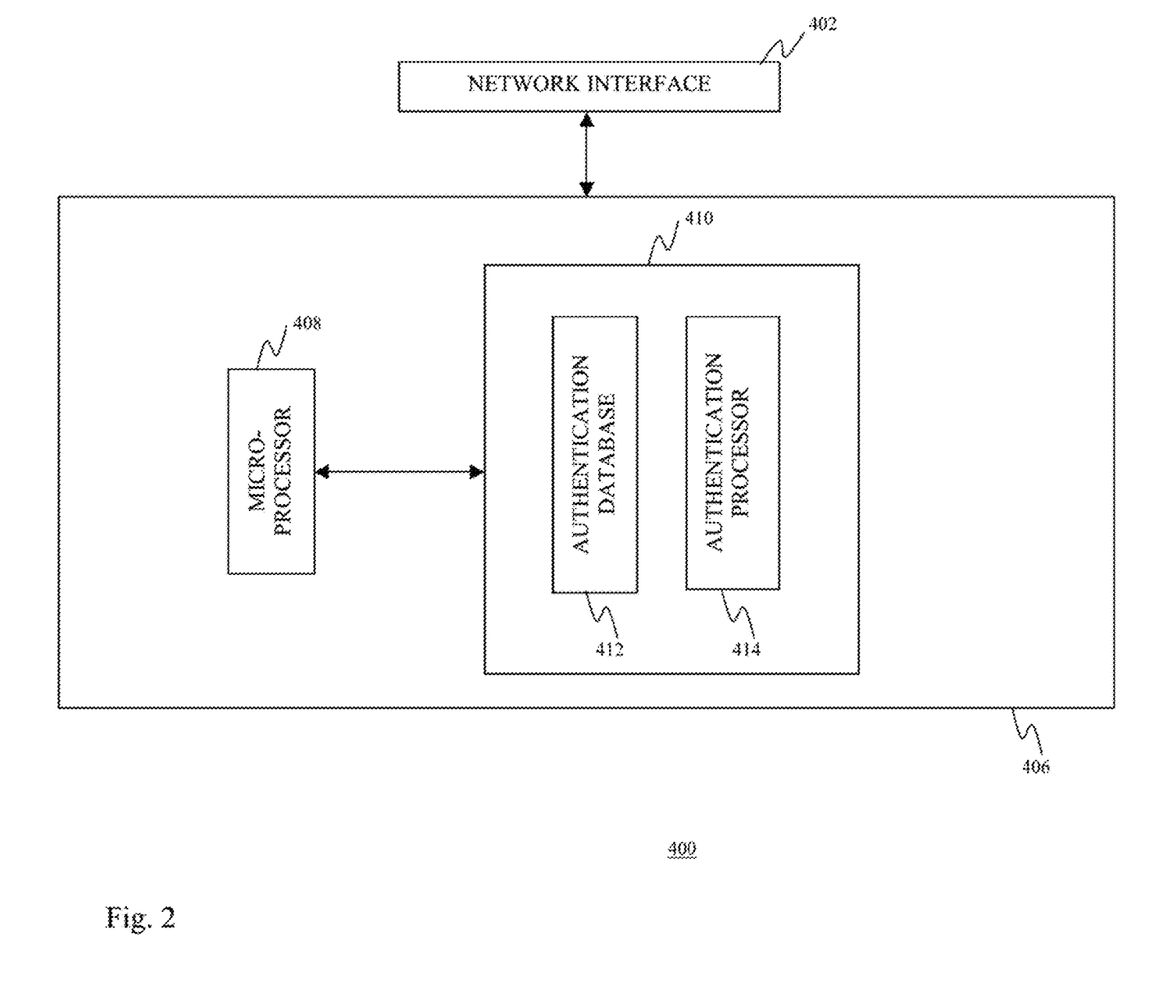
FIG. 2 is a schematic view of an exemplary authentication server, in accordance with the disclosed embodiments.

As shown in FIG. 2, the authentication server 400 includes a network interface 402, and a computer processing system 406 that is coupled to the network interface 402. The network interface 402 interfaces the authentication server 400 with the communications network 130 to thereby allow the authentication server 400 to communicate with the online banking server 300. The network interface 402 also interfaces the authentication server 400 with the communications network 150 to thereby allow the authentication server 400 to communicate with the issuer server 500.

The computer processing system 406 may include one or more microprocessors 408 and a tangible, non-transitory computer-readable medium 410. The computer-readable medium 410 may be provided as electronic computer memory (e.g. flash memory) or optical or magnetic memory (e.g. compact disc, hard disk). The computer-readable medium 410 maintains an authentication database 412 that includes a plurality of clusters, each uniquely associated with a cardholder of the financial institution.

Preferably, each database cluster of the authentication database 412 identifies a cardholder credential (e.g. username/card number, passcode) that is uniquely associated with the cardholder, and a credit card that is issued to the cardholder. The database cluster identifies the unique credit card number (Primary Account Number or "PAN") of the credit card, and the expiry date of the credit card. Typically, each credit card number consists of 15 or 16 digits, including the issuer identification number. As will be discussed, the authentication server 400 uses the 15- or 16-digit PAN identified in the authentication database 412 to authenticate the cardholder of the credit card and thereby authorize a high risk transaction. Therefore, each of the credit cards is referred to herein as an "authentication card".

Each database cluster of the authentication database 412 also includes one or more partial payment card numbers of payment cards ("associated payment cards") that are issued by a payment card issuer, on behalf of the financial institution, to the cardholder of the authentication card. Each partial payment card number comprises a portion of the digits of the payment card number of the associated payment card, and has fewer digits than the payment card number of the associated payment card, and has fewer digits than the unique PAN of the authentication card. One or more of the partial payment card numbers may be a portion of the digits of the PAN of the authentication card (i.e. fewer digits than the account number of the authentication card).

Preferably, each partial payment card number excludes the issuer identification number of the associated payment card. As examples, each partial payment card number may comprise the final 8 digits of the 15- or 16-digit PAN of the associated payment card, or either of the two final groups of 4 digits of the PAN of the associated payment card. Each database cluster of the authentication database 412 may also identify the card security code (e.g. Card Verification Value (CVV), CVV2, Card Verification Code (CVC), Card Identification Number (CID)) and expiry date of the associated payment card.

The tangible, non-transitory computer-readable medium 410 also maintains computer processing instructions stored thereon which, when executed by the microprocessor(s) 408, define an operating system (not shown) that controls the overall operation of the authentication server 400. The computer processing instructions, when executed by the microprocessor(s) 408, also implement an authentication processor 414.

The authentication processor 414 is configured to request an authentication credential from the communications terminal 200 in response to the banking server 300 determining that the requested online transaction possesses an inherent high risk of fraud.

The authentication processor 414 is configured to receive, in response to the authentication credential request, an authentication credential from the communications terminal, and to use the received cardholder credential and the received authentication credential to locate the authentication card that is uniquely associated with the payment cardholder and the received authentication credential in the database. The received authentication credential has fewer digits than the account number of the located authentication card.

The authentication processor 414 may also be configured to authorize the requested online transaction in response to authenticating the payment cardholder using the account number of the located authentication card.

Although the authentication processor 414 may be implemented as computer processing instructions, all or a portion of the functionality of the authentication processor 414 may be implemented instead in electronics hardware.

Issuer Server

The issuer server 500 may include a computer server that is configured to communicate with the authentication server 400 via the communications network 150. The issuer server 500 is typically deployed by a credit card issuer, and maintains a plurality of accounts each uniquely associated with a respective credit card.

The issuer server 500 maintains an accounts database that includes a plurality of clusters each associated with a respective credit card. Each database cluster typically identifies the 15- or 16-PAN and expiry date of the credit card that is associated with the respective account, the cardholder name, and the current financial balance of the account.

Method of Authorizing Payment Card-Based Transactions

As discussed, one or more of the components of the cardholder authentication network 100 implement a method of authorizing an online transaction. As depicted, by way of overview, in FIG. 3, at step S300 the online banking server 300 authenticates a payment cardholder from a cardholder credential that is received from one of the communications terminals 200. At step S302, the banking server 300 receives from the communications terminal 200 a request to initiate an online transaction with the online banking server 300.

Figure 3:
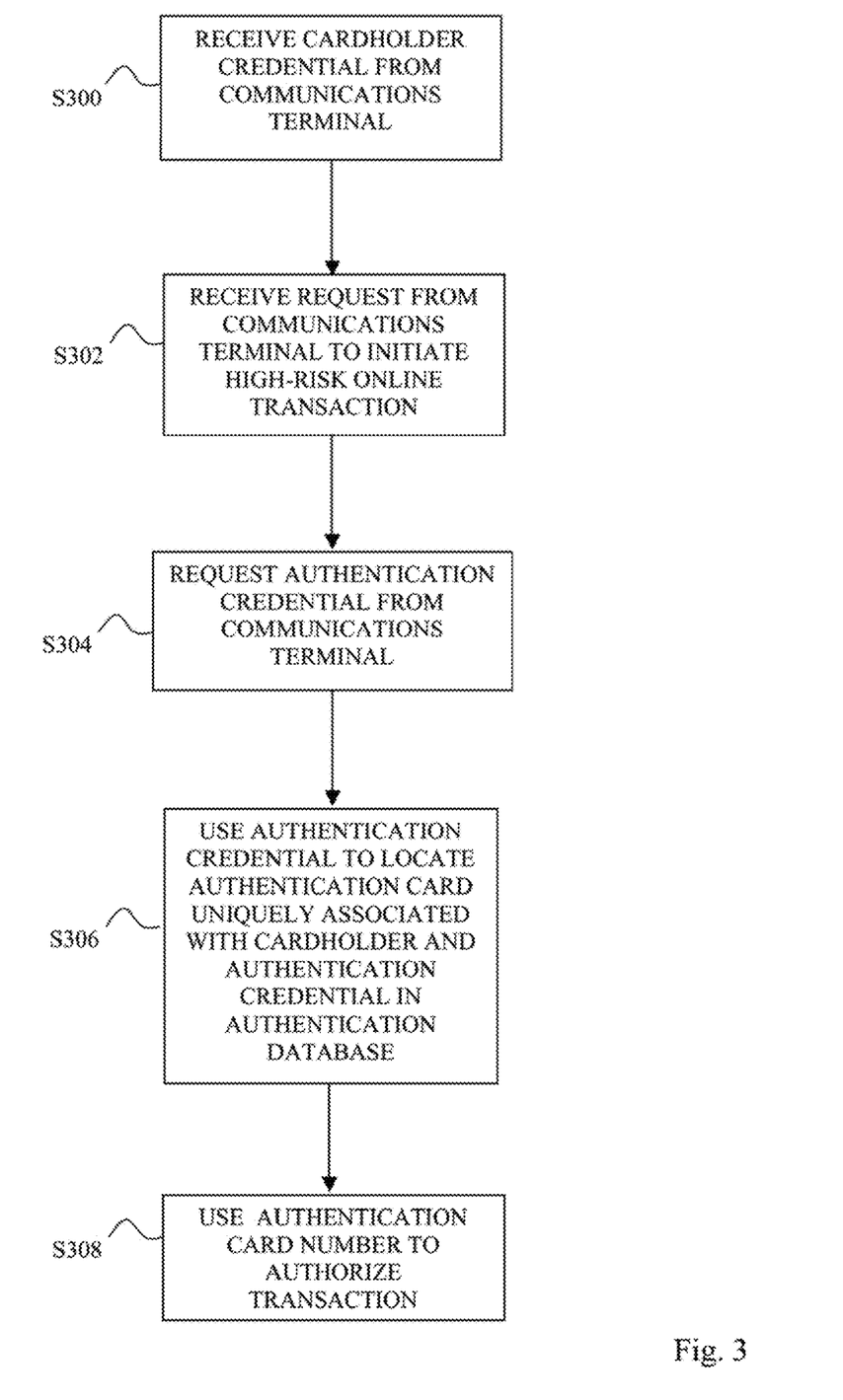
FIG. 3 is flow chart generally depicting the method for authorizing a high risk online transaction, in accordance with the disclosed embodiments.

In response to the banking server 300 determining that the requested online transaction possesses an inherent high risk of fraud, at step S304 the authentication server 400 (or the banking server 300, if the functionality of the authentication server 400 is incorporated into the banking server 300) requests an authentication credential from the communications terminal 200. As discussed, the authentication server 400 is in communication with the authentication database 412, which comprises a plurality of database clusters each uniquely associated with a respective payment cardholder. Each database cluster identifies a unique account number of an authentication card that is issued to the payment cardholder, and a partial payment card number of at least one payment card that is associated with the authentication card. Each partial payment card number has fewer digits than the associated unique account number.

In response to the authentication credential request, at step S306 the authentication server 400 (or the banking server 300) receives an authentication credential from the communications terminal 200, and uses the received cardholder credential and the received authentication credential to locate the authentication card that is uniquely associated with the payment cardholder and the received authentication credential in the authentication database 412. The received authentication credential has fewer digits than the account number of the located authentication card. At step S308, the authentication server 400 (or the banking server 300) authorizes the requested online transaction in response to authenticating the payment cardholder using the account number of the located authentication card.

Figure 4:
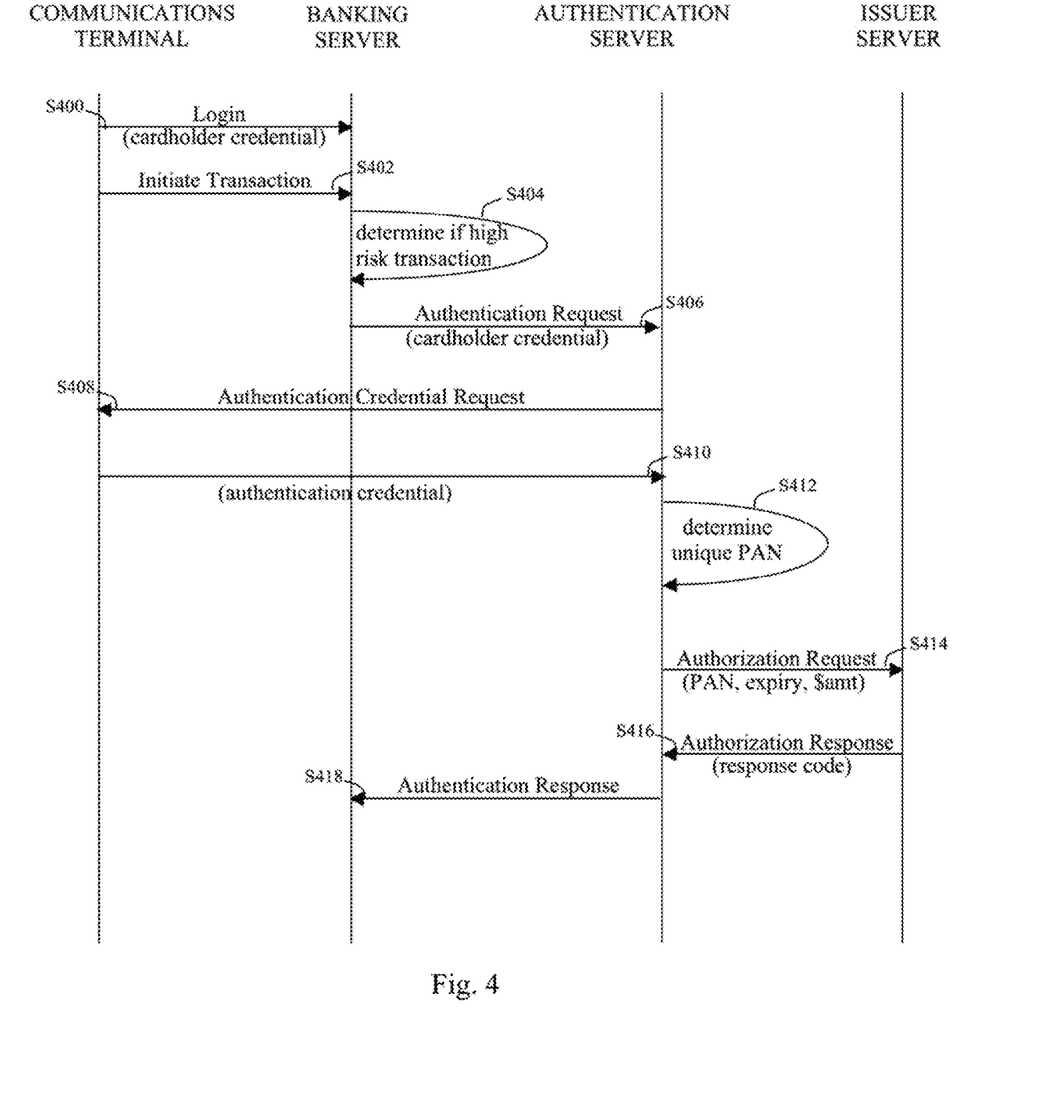
FIG. 4 is a message flow diagram depicting the method for authorizing a high risk online transaction, in accordance with the disclosed embodiments.

A sample method of authenticating a payment cardholder will now be discussed in detail with reference to FIG. 4. At the outset of the method, a payment cardholder uses one of the communications terminal 200 to establish an encrypted communications channel (e.g. SSL/TLS connection) with the online banking server 300, via the communications network 120. At step S400, the cardholder uses the communications terminal 200 to login or authenticate to the online banking server 300 by transmitting to the online banking server 300, via the communications channel, the cardholder credentials (e.g. username, payment card number) that the cardholder normally uses to initiate online banking with the online banking server 300.

The online banking server 300 may use the cardholder database to validate the cardholder credentials. Based on the outcome of the validation process, the online banking server 300 may grant the cardholder access to the financial accounts that are associated with the cardholder in the accounts database.

After the online banking server 300 grants the cardholder access to the cardholder's financial accounts, at step S402 the cardholder may use the communications terminal 200 to initiate a card-not-present online transaction with the online banking server 300 via the communications channel that was established with the online banking server 300. As examples of card-not-present online transactions, the cardholder may pay a bill from one of the cardholder's financial accounts or transfer funds between financial accounts.

If the cardholder initiates a card-not-present online transaction with the online banking server 300, at step S404 the online banking server 300 determines whether the transaction is a high risk transaction. If the online banking server 300 determines that the card-not-present online transaction is not a high risk transaction, the online banking server 300 proceeds with the transaction. However, if the online banking server 300 determines that the transaction is a high risk transaction (e.g. the transaction involves a transfer or payment of a large monetary amount, or opening a new financial account), the online banking server 300 generates an authentication request message that includes one of the cardholder credentials, and sends the authentication request message to the authentication server 400, at step S406, requesting that the authentication server 400 authenticate the cardholder. Typically, the authentication request message includes the payment card number that the online banking server 300 received from the communications terminal 200 at step S400.

At step S408, the authentication server 400 generates an authentication credential request, and sends the authentication credential request to the communications terminal 200, via the online banking server 300. Upon receipt of the authentication credential request, the communications terminal 200 generates a "pop-up" message on the display device of the communications terminal 200, requesting that the cardholder provide the authentication server 400 with an authentication credential that authenticates the cardholder to the authentication server 400.

Preferably, the authentication credential comprises the partial payment card number of one of the payment cards that is associated with cardholder's authentication card in the authentication database 412. As discussed, the partial payment card number may comprise the final 8 digits of the 15- or 16-PAN of the associated payment card, or either of the two final groups of 4 digits of the PAN of the associated payment card. The authentication credential may also include the expiry date and/or the card security code of the partial payment card.

Preferably, the communications terminal 200 establishes an "out-of-band" communications channel with the authentication server 400 (i.e. a communications channel that is distinct from the communications channel that was established with the online banking server 300 at step S400). After the cardholder inputs the authentication credential into the communications terminal, the communications terminal 200 sends the authentication credential to the authentication server 400 over the out-of-band communications channel (e.g., at step S410).

The authentication credential request may include Javascript code which, when executed by the data processing system of the communications terminal 200, establishes the out-of-band communications channel, opens a new data input window for receiving the authentication credential, and sends the authentication credential to the authentication server 400 over the out-of-band communications channel. The data processing system may generate a string from the partial payment card number, and the expiry date and/or card security code, and include the string in the authentication credential. Alternately, the data processing system may generate a hash value from the partial payment card number, expiry date and/or card security code, and include the generated hash value in the authentication credential.

Upon receipt of the authentication credential from the communications terminal 200, at step S412 the authentication server 400 uses the cardholder credential (e.g., as received at step S406) and the received authentication credential to locate in the authentication database 412 the authentication card that is uniquely associated with the payment cardholder and with the received authentication credential in the authentication database 412. To do so, the authentication server 400 may query the authentication database 412 with the received cardholder credential to locate the database cluster that is uniquely associated with the payment cardholder, and may query the located database cluster with the authentication credential for the payment card number of the authentication card (i.e. for an entry that matches the authentication credential for the cardholder).

If the authentication database 412 does not include an entry that matches the authentication credential for the cardholder (i.e. an entry that is uniquely associated with the authentication credential and the cardholder credential), the authentication server 400 may generate an error message and transmit the error message to the online banking server 300. Alternately, the authentication database 412 may include an error counter associated with each authentication card, and may prohibit future use of any of the associated payment cards on the cardholder authentication network 100 if the error counter associated with the authentication card reaches a predetermined maximum limit.

If the authentication database 412 includes an entry that matches the authentication credential for the cardholder, the query returns the 15- or 16-digit PAN of the authentication card and the expiry date of the authentication card. The authentication server 400 then uses the PAN and expiry date of the authentication card to authenticate the cardholder. To do, the authentication server 400 generates an authorization request for authorization of a financial transaction using the authentication card, and sends the authorization request to the issuer server 500, via the communications network 150, at step S414, requesting authorization for the financial transaction. The authorization request includes the PAN and expiry date of the authentication card, and specifies a transaction amount for the financial transaction. Preferably, the transaction amount is zero.

Upon receipt of the authorization request, the issuer server 500 authorizes the financial transaction in the usual manner, for example by verifying that the PAN specified in the authorization request is valid, and that the authentication card has not expired or been revoked. The issuer server 500 then generates an authorization response (either authorizing or declining the financial transaction), and transmits the authorization response to the authentication server 400, at step S416.

The authentication server 400 responds to the authentication request message (e.g., received from the online banking server 300 at step S404) by generating an authentication response message from the authorization response, and transmitting the authentication response message to the online banking server 300, at step S418. If the authorization response authorized the financial transaction, the authentication response message confirms that the cardholder was successfully authenticated. Otherwise, the authentication response message does not confirm that the cardholder was authenticated.

If the authentication response message confirms that the cardholder was successfully authenticated, the online banking server 300 proceeds with the high risk card-not-present online transaction that was initiated by the cardholder at step S402. Otherwise, the online banking server 300 terminates the high risk card-not-present online transaction.

The invention claimed is:

1. An authorization system comprising:
   a database comprising a plurality of database records each including a card number and an account number associated with the card number, each said card number having fewer digits than the associated account number; and
   at least one computer server in communication with the database and configured to:
   receive a request message from a communications terminal, the request message initiating a transaction with the at least one computer server;
   request an authentication credential from the communications terminal;
   receive the authentication credential from the communications terminal, in the database locate the card number matching the received authentication credential, and locate the account number associated with the located card number in the database;
   request authorization of a test transaction using the located account number, and receive an authorization response confirming authorization of the test transaction, the test transaction being different from the initiated transaction; and
   authorize the initiated transaction in response to the authorization response.

2. The authorization system according to claim 1, wherein one of the database records includes a cardholder credential associated with the account number and the card number, and the at least one computer server is configured to receive the cardholder credential from the communications terminal, and to locate the card number by querying the database with the received cardholder credential and the received authentication credential.

3. The authorization system according to claim 2, wherein the at least one computer server is configured to validate the received cardholder credential prior to authorizing the initiated transaction.

4. The authorization system according to claim 3, wherein the at least one computer server is configured to receive the cardholder credentials via a first communications channel established with the communications terminal, and to receive the authentication credential via a second communications channel established with the communications terminal, wherein the second communications channel is distinct from the first communications channel.

5. The authorization system according to claim 1, wherein one of the database records includes an expiration date associated with the account number and the card number, and the at least one computer server is configured to locate the account number and the expiration date associated with the card number in the database, and to request authorization of the test transaction using the located account number and the located expiration date.

6. The authorization system according to claim 5, wherein the at least one computer server is configured to request authorization of the test transaction using the located account number and the located expiration date by transmitting to an issuer server an authorization request for a financial transaction, and is configured to receive the authorization response from the issuer server, wherein the authorization request includes the located account number, the located expiration date and a transaction amount.

7. The authorization system according to claim 1, wherein the least one computer server is configured to request the authentication credential after determining that the initiated transaction has an inherent high risk of fraud.

8. The authorization system according to claim 7, wherein the least one computer server is configured to determine that the initiated transaction has a high risk of fraud by determining that the initiated transaction involves one of a transfer or payment of a large monetary amount and opening a new financial account.

9. A method of authorizing a transaction with at least one computer server, the at least one computer server being in communication with a database comprising a plurality of database records each including a card number and an account number associated with the card number, each said card number having fewer digits than the associated account number, the method comprising:
   the at least one computer server receiving a request message from a communications terminal, the request message initiating a transaction with the at least one computer server;
   the at least one computer server requesting an authentication credential from the communications terminal;
   the at least one computer server receiving the authentication credential from the communications terminal, in the database locating the card number matching the received authentication credential, and locating the account number associated with the located card number in the database;
   the at least one computer server requesting authorization of a test transaction using the located account number, and receiving an authorization response confirming authorization of the test transaction, the test transaction being different from the initiated transaction; and
   the at least one computer server authorizing the initiated transaction in response to the authorization response.

10. The method according to claim 9, wherein one of the database records includes a cardholder credential associated with the account number and the card number, the receiving a request message comprises the at least one computer server receiving the cardholder credential from the communications terminal, and the locating the card number comprises the at least one computer server querying the database with the received cardholder credential and the received authentication credential.

11. The method according to claim 10, wherein the receiving a request message further comprises the at least one computer server validating the received cardholder credential prior to authorizing the initiated transaction.

12. The method according to claim 11, wherein the at least one computer server receives the cardholder credential via a first communications channel established with the communications terminal, and receives the authentication credential via a second communications channel established with the communications terminal, wherein the second communications channel is distinct from the first communications channel.

13. The method according to claim 9, wherein one of the database records includes an expiration date associated with the account number and the card number, the locating the account number comprises the at least one computer server locating the account number and the expiration date associated with the card number in the database, and the requesting authorization comprises the at least one computer server requesting authorization of the test transaction using the located account number and the located expiration date.

14. The method according to claim 13, wherein the requesting authorization of the test transaction using the located account number and the located expiration date comprises the at least one computer server transmitting to an issuer server an authorization request for a financial transaction, and the receiving the authorization response comprises the at least one computer server receiving the authorization response from the issuer server, wherein the authorization request includes the located account number, the located expiration date and a transaction amount.

15. The method according to claim 9, wherein the requesting an authentication credential comprises the at least one computer server requesting the authentication credential after determining that the initiated transaction has an inherent high risk of fraud.

16. The method according to claim 15, wherein the determining that the initiated transaction has a high risk of fraud comprises the at least one computer server determining that the initiated transaction involves one of a transfer or payment of a large monetary amount and opening a new financial account.

17. A tangible non-transitory computer-readable medium carrying computer processing instructions stored thereon which, when executed by a computer server, cause the computer server to:
receive a request message from a communications terminal, the request message initiating a transaction with the computer server;
request an authentication credential from the communications terminal;
receive the authentication credential from the communications terminal, and in a database (i) locate a card number matching the received authentication credential, and (ii) locate an account number associated with the located card number in the database, the database comprising a database record including the account number and the card number, the card number having fewer digits than the associated account number;
request authorization of a test transaction using the located account number, and receive an authorization response confirming authorization of the test transaction, the test transaction being different from the initiated transaction; and
authorize the initiated transaction in response to the authorization response.

18. The computer-readable medium according to claim 17, wherein the database record includes a cardholder credential associated with the account number and the card number, and the processing instructions cause the computer server to receive the cardholder credential from the communications terminal, and to locate the card number by querying the database with the received cardholder credential and the received authentication credential.

19. The computer-readable medium according to claim 18, wherein the processing instructions cause the computer server to validate the received cardholder credential prior to authorizing the initiated transaction.

20. The computer-readable medium according to claim 19, wherein the processing instructions cause the computer server to receive the cardholder credentials via a first communications channel established with the communications terminal, and to receive the authentication credential via a second communications channel established with the communications terminal, wherein the second communications channel is distinct from the first communications channel.

21. The computer-readable medium according to claim 17, wherein the database record includes an expiration date associated with the account number and the card number, and the processing instructions cause the computer server to locate the account number and the expiration date associated with the card number in the database, and to request authorization of the test transaction using the located account number and the located expiration date.

22. The computer-readable medium according to claim 21, wherein the processing instructions cause the computer server to request authorization of the test transaction using the located account number and the located expiration date by transmitting to an issuer server an authorization request for a financial transaction, and the processing instructions cause the computer server to receive the authorization response from the issuer server, wherein the authorization request includes the located account number, the located expiration date and a transaction amount.

23. The computer-readable medium according to claim 17, wherein the processing instructions cause the computer server to request the authentication credential after determining that the initiated transaction has an inherent high risk of fraud.

24. The computer-readable medium according to claim 23, wherein the processing instructions cause the computer server to determine that the initiated transaction has a high risk of fraud by determining that the initiated transaction involves one of a transfer or payment of a large monetary amount and opening a new financial account.

* * * * *